(12) United States Patent
Fesi

(10) Patent No.: US 8,696,242 B1
(45) Date of Patent: Apr. 15, 2014

(54) OIL SKIMMER AND METHOD

(76) Inventor: Michael A. Fesi, Houma, LA (US)

( * ) Notice: Subject to any disclaimer, the term of this patent is extended or adjusted under 35 U.S.C. 154(b) by 142 days.

(21) Appl. No.: 13/163,196

(22) Filed: Jun. 17, 2011

Related U.S. Application Data (60) Provisional application No. 61/355,911, filed on Jun. 17, 2010.

(51) Int. Cl.
  *E02B 15/00* (2006.01)
(52) U.S. Cl.
  USPC ............ 405/60; 405/63; 210/242.3; 210/776; 210/923
(58) Field of Classification Search
  USPC ............... 405/52, 60, 63, 64; 210/242.3, 776, 210/923, 747.6, 170.05, 170.11
  See application file for complete search history.

(56) References Cited

U.S. PATENT DOCUMENTS

| | | | |
|---|---|---|---|
| 3,704,784 A | 12/1972 | Craggs et al. | |
| 3,730,346 A | 5/1973 | Prewitt | |
| 3,754,653 A | 8/1973 | Verdin | |
| 3,822,789 A | 7/1974 | Crisafulli | |
| 3,862,904 A | 1/1975 | Weatherford | |
| 3,951,810 A | 4/1976 | Crisafulli | |
| 4,208,287 A | 6/1980 | Brieck | |
| 4,477,348 A | 10/1984 | Ayers et al. | |
| 5,043,065 A | 8/1991 | Propp | |
| 5,173,182 A * | 12/1992 | Debellian | 210/170.04 |
| 5,216,974 A | 6/1993 | Gordon, Sr. | |
| 5,478,483 A | 12/1995 | Gore | |
| 5,753,108 A | 5/1998 | Haynes et al. | |
| 6,471,862 B1 | 10/2002 | Rockwell | |

* cited by examiner

*Primary Examiner* — Sean Andrish
(74) *Attorney, Agent, or Firm* — Garvey, Smith, Nehrbass & North, L.L.C.; Seth M. Nehrbass; Charles C. Garvey, Jr.

(57) ABSTRACT

An apparatus for removing oil or other pollutants from the surface of water, comprising a platform having a left side wall, aright side wall, a rear wall, a front opening, a floor, and a bottom, one or more ballasts which adjust the platform floor relative to a level of oil on the water surface, wherein the oil flows from the front opening across the floor to the rear wall, a rear location near the rear wall to collect the oil from the platform floor; and a pump connected to the rear location that removes the oil from the rear location to a storage area which does not affect the ballast of the platform. The skimmer vessel can work stationary in the water, and does not require a propellor means, as the oil will continue to flow into the skimmer as the oil is pumped out of the rear by the gravity flow to the rear of the vessel.

31 Claims, 8 Drawing Sheets

OIL SKIMMER AND METHOD

CROSS-REFERENCE TO RELATED APPLICATIONS

This is a non provisional patent application of U.S. Provisional Patent Application Ser. No. 61/355,911, filed 17 Jun. 2010.

Priority of US Provisional Patent Application Ser. No. 61/355,911, filed 17 Jun. 2010, incorporated herein by reference, is hereby claimed.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The apparatus of the present invention relates to skimming devices. More particularly, this invention relates to skimming devices for removal of oil or other pollutants from the surface water.

2. General Background of the Invention

There are skimming devices in the art, however, it is desirable that a skimming apparatus be a simple device that can work stationary in the water, and does not require a propellor or pulling means for operation, and easily adjustable so that the mouth of the skimmer sits at the interface of the oil and the water. It is also desirable that a user not need to continually adjust the skimmer elevation during use.

Examples of possibly related patents directed to such devices are listed in the following table.

The following U.S. Patents are incorporated herein by reference:

TABLE

| PAT. NO. | TITLE | ISSUE DATE |
| --- | --- | --- |
| 3,704,784 | Floating Oil Skimmer | Dec. 5, 1972 |
| 3,730,346 | Skimming System | May 1, 1973 |
| 3,754,653 | Apparatus and Method for Collection of Oil from Surface of the Sea | Aug. 28, 1973 |
| 3,822,789 | Oil Skimmer Module with Free Floating Weir Trough | Jul. 9, 1974 |
| 3,862,904 | Boat for collecting oil slicks and other contaminants from the surface of water | Jan. 28, 1975 |
| 3,951,810 | Oil skimmer module with free floating weir trough | Apr. 20, 1976 |
| 4,208,287 | Oil spill skimmer | Jun. 17, 1980 |
| 4,477,348 | Open Sea Skimmer Barge | Oct. 16, 1984 |
| 5,043,065 | Variable draft oil/debris skimming vessel | Aug. 27, 1991 |
| 5,216,974 | Vessel for collecting and separating oil/water in a marine environment using submerged internal collection and separation | Jun. 8, 1993 |
| 5,478,483 | Oil spill skimmer with adjustable floating weir | Dec. 26, 1995 |
| 5,753,108 | Integrated oil response and recovery system and method and skimmer for use therein | May 19, 1998 |
| 6,471,862 | Oil skimming apparatus | Oct. 29, 2002 |

BRIEF SUMMARY OF THE INVENTION

The apparatus of the present invention includes a platform having a left side wall, a right side wall, a rear wall, a front opening, a floor, and a bottom, one or more ballasts which adjust the platform floor relative to a level of oil on the water surface, wherein the oil flows from the front opening across the floor to the rear wall, a rear location near the rear wall to collect the oil from the platform floor, and a pump connected to the rear location that removes the oil from the rear location to a storage area which does not affect the ballast of the platform.

Preferably, the floor is unobstructed.

Preferably, the bottom is flat.

Preferably, the level of the platform floor is variable to the consistency of the oil or pollutant on the water surface.

The apparatus can further comprise one or more propellers attached to the platform to self-propel the platform through the water.

Preferably, the apparatus further comprises a second vessel in which the oil is contained.

The apparatus can be moved by a hydraulic propellor, an outboard or a small boat.

Preferably, a vertical wall separates the ballast tanks.

The apparatus of the present invention includes a platform having a left side wall, a right side wall, a rear wall, a front opening, a floor, and a bottom, one or more ballasts which adjust the platform floor relative to a level of oil on the water surface, wherein the oil flows from the front opening across the floor to the rear wall, a rear location near the rear wall to collect the oil from the platform floor, and a pump connected to the rear location that moves the oil from the rear location to a storage area which does not affect the ballast of the platform.

The apparatus of the present invention includes a platform having a left side wall, a right side wall, a rear wall, a front opening, a floor, and a bottom, one or more ballasts which adjust the platform floor relative to a level of oil on the water surface, a rear location near the rear wall to collect the oil from the platform floor, and a pump connected to the rear location that moves the oil from the rear location to a storage area which does not affect the ballast of the platform, wherein the oil flows from the front opening across the floor to the rear wall when the front opening is below the surface of the oil.

The present invention includes an apparatus for removing oil or other pollutants from the surface of water, comprising a platform having a left side wall, a right side wall, a rear wall, a front opening, an unobstructed floor, and a flat bottom, one or more ballasts located in the platform, wherein the ballasts adjust the platform floor relative to a predetermined level of oil on the water surface, one or more propellers attached to the platform to self-propel the platform through the water, wherein the oil flows from the front opening across the floor to the rear wall as the platform is being self-propelled, a rear location near the rear wall to collect the oil from the platform floor, and a pump connected to the rear location that removes the oil from the rear location to a storage area.

Preferably, the platform floor floats right below the surface of the oil.

Preferably, the ballasts are located in the left side wall and the right side wall.

Preferably, the rear location is a box or tank.

Preferably, the pump is a hydraulic pump.

Preferably, the rear location sits at a lower elevation than the floor.

The present invention includes an apparatus for removing oil or other pollutants from the surface of water, comprising a platform having a left side wall, a right side wall, a rear wall, a front opening, an unobstructed floor, and a flat bottom, one or more ballasts located in the platform, wherein the ballasts adjust the platform floor relative to a predetermined level of oil on the water surface, one or more propellers attached to the platform to self-propel the platform through the water, wherein the oil flows from the front opening across the floor to the rear wall as the platform is being self-propelled, a rear location near the rear wall to collect the oil from the platform floor, and a pump connected to the rear location that moves the oil from the rear location to a storage area.

Preferably, the platform floor is about at the interface of the oil and the water. Preferably, the platform floor floats right below the surface of the oil.

Preferably, the ballasts are located in the left side wall and the right side wall.

Preferably, the rear location is a box or tank.

Preferably, the pump is a hydraulic pump.

Preferably, the rear location sits at a lower elevation than the floor.

BRIEF DESCRIPTION OF THE DRAWINGS

For a further understanding of the nature, objects, and advantages of the present invention, reference should be had to the following detailed description, read in conjunction with the following drawings, wherein like reference numerals denote like elements and wherein.

DETAILED DESCRIPTION OF THE INVENTION

A preferred embodiment of the apparatus of the present invention is shown in FIGS. 1-8.

Figure 1:
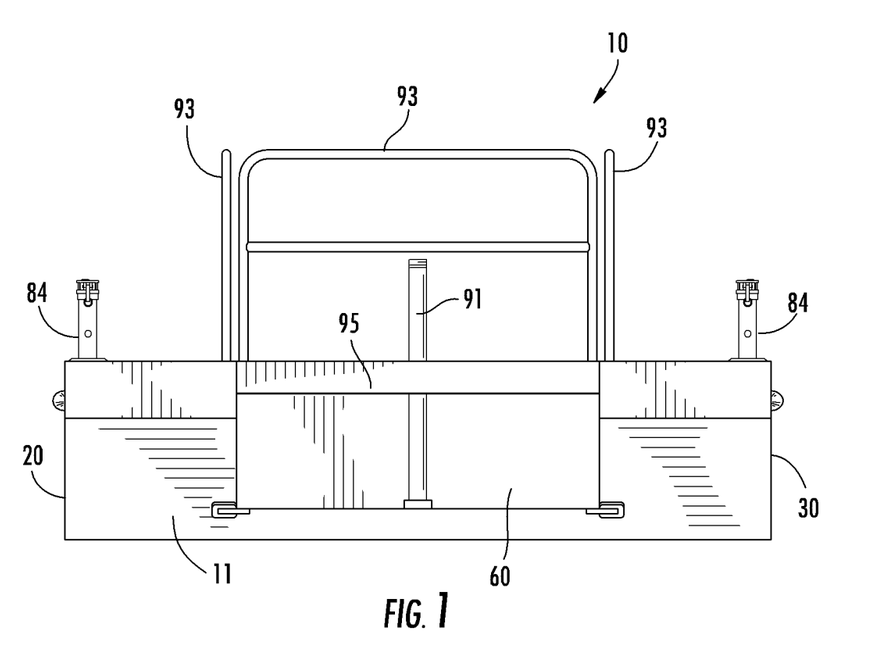
FIG. 1 is a front view of a preferred embodiment of the apparatus of the present invention.
Figure 2:
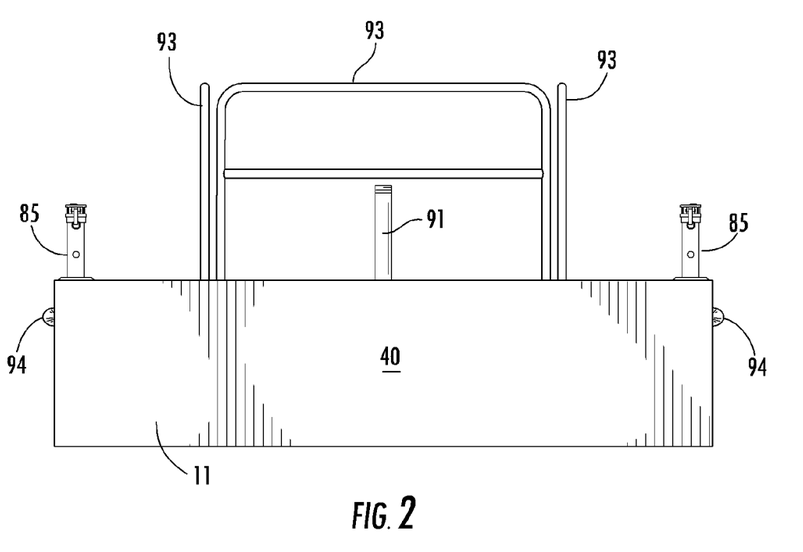
FIG. 2 is a rear view of a preferred embodiment of the apparatus of the present invention.
Figure 3:
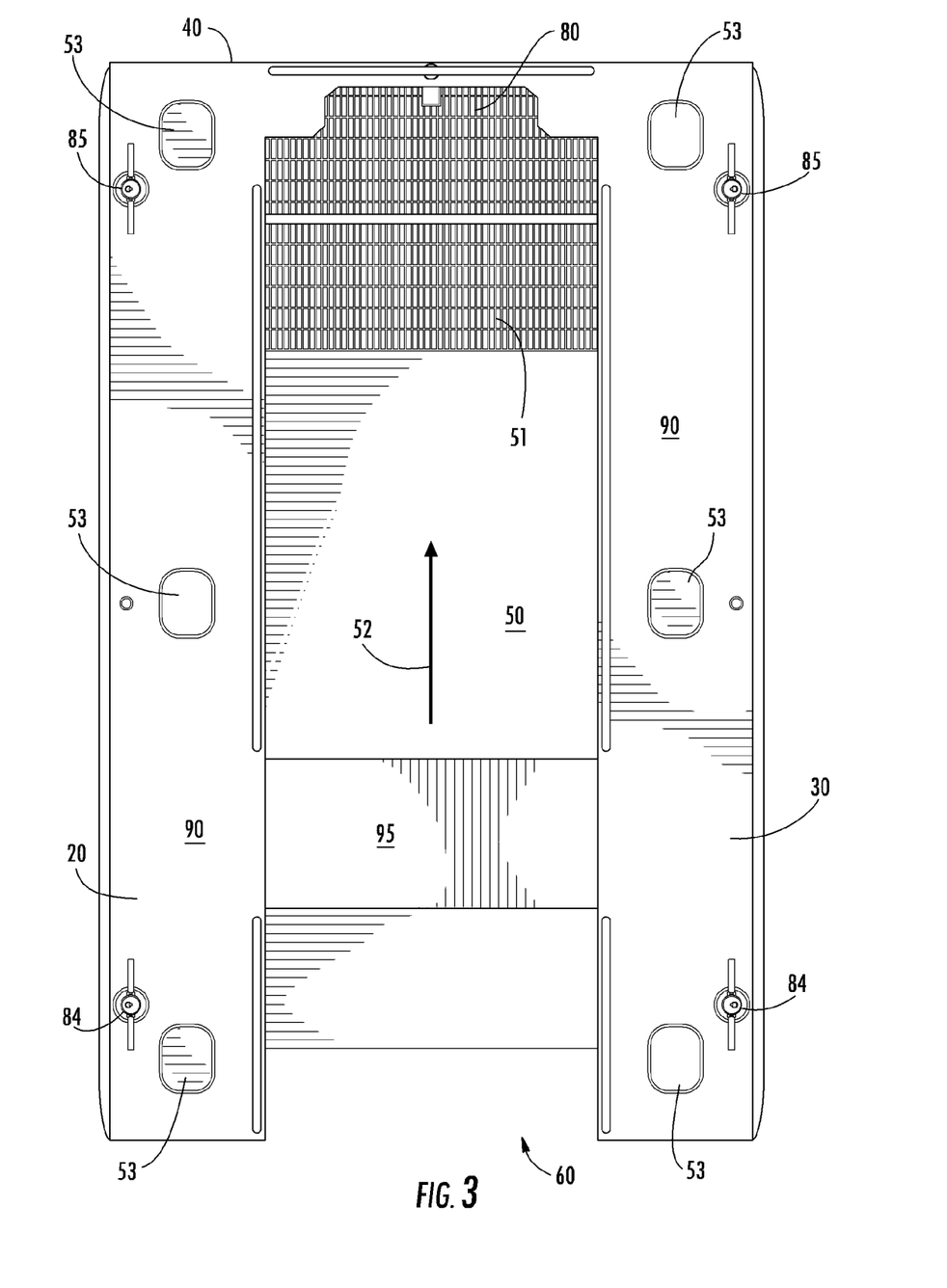
FIG. 3 is a top view of a preferred embodiment of the apparatus of the present invention.
Figure 4:
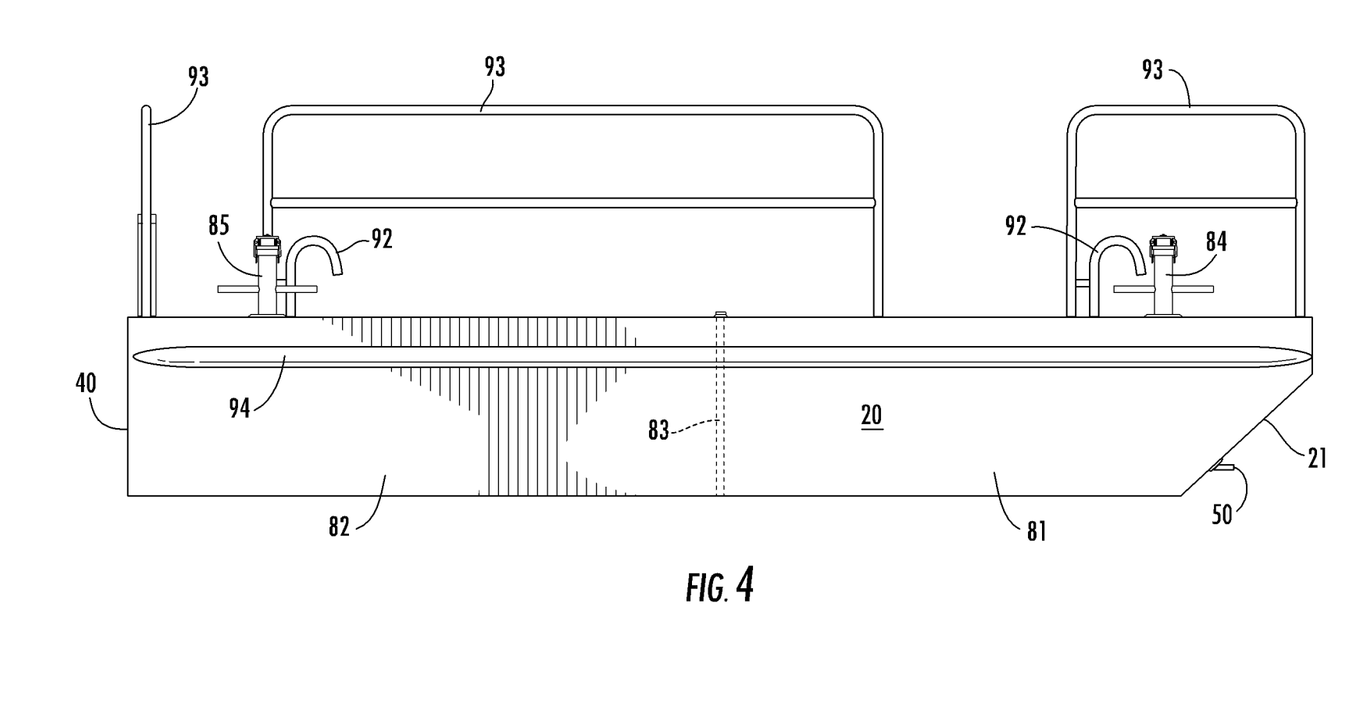
FIG. 4 is a right side view of a preferred embodiment of the apparatus of the present invention.
Figure 5:
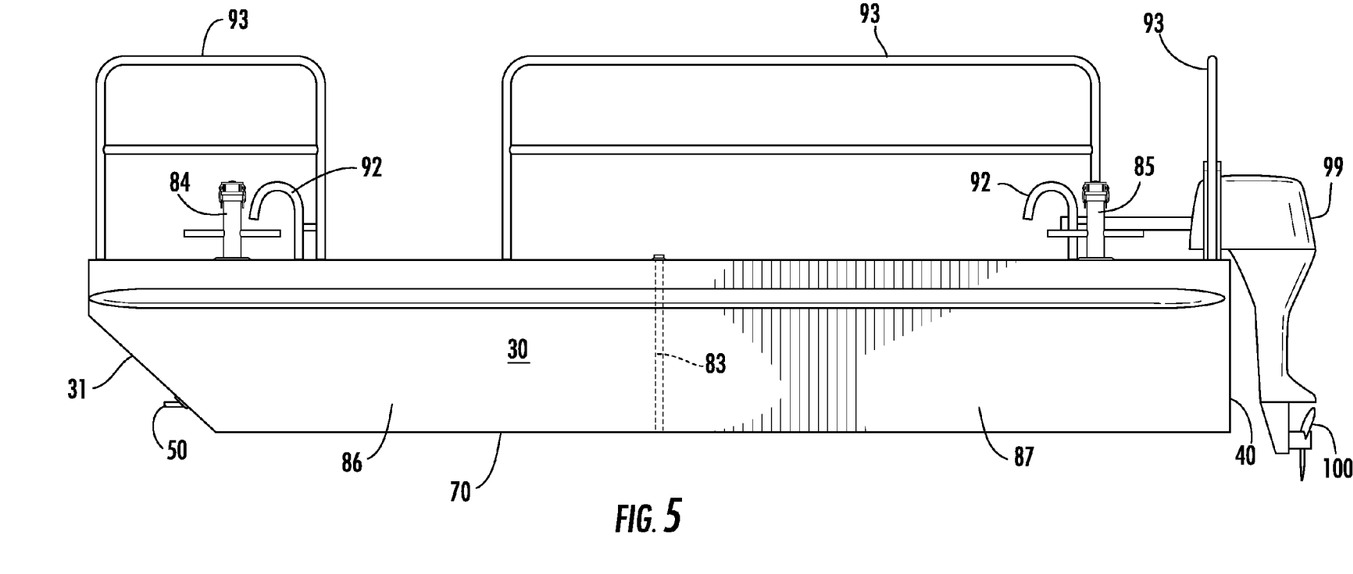
FIG. 5 is a left side view of a preferred embodiment of the apparatus of the present invention.
Figure 6:
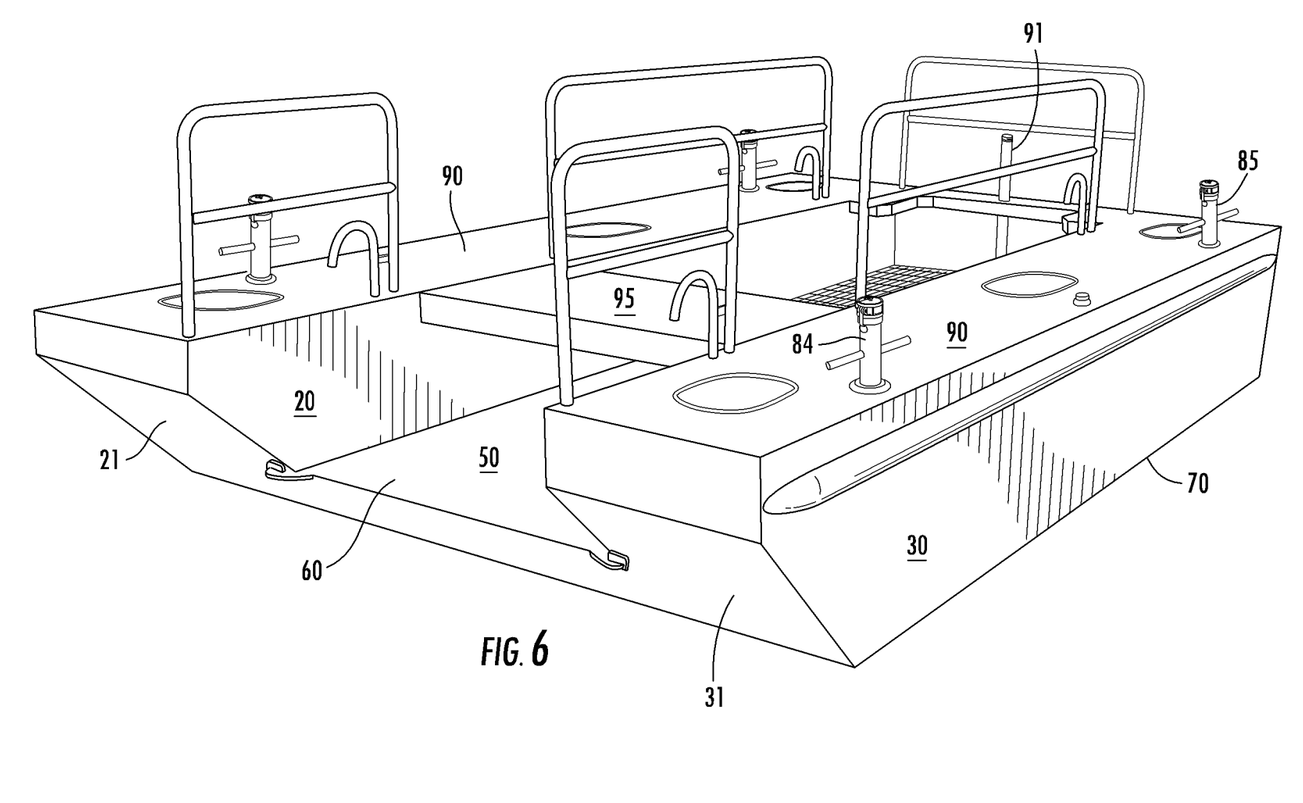
FIG. 6 is a perspective view of a preferred embodiment of the apparatus of the present invention.
Figure 7:
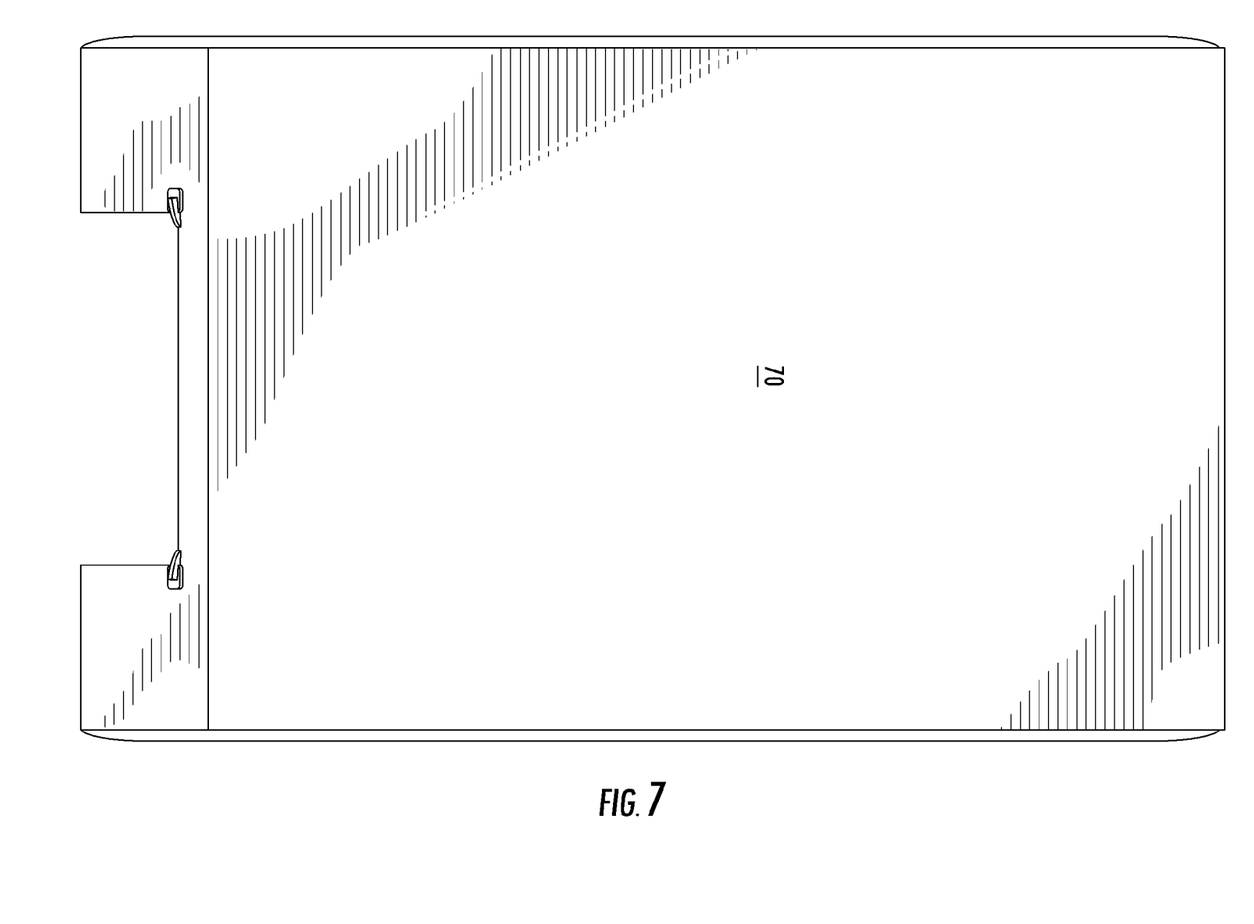
FIG. 7 is a bottom view of a preferred embodiment of the apparatus of the present invention.
Figure 8:
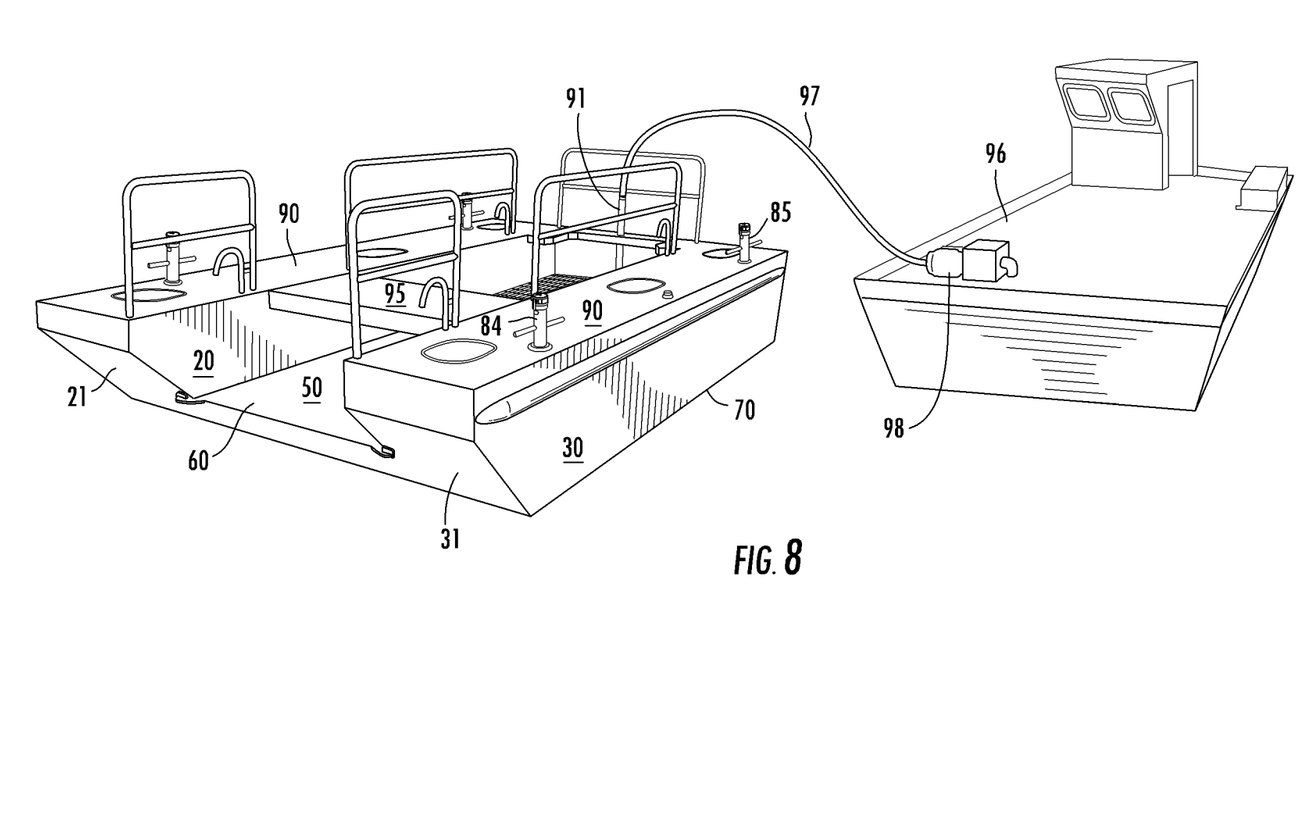
FIG. 8 is a perspective view of a preferred embodiment of the apparatus of the present invention.

The skimmer 10 of the present invention is a barge-style device for collecting oil or other pollutants from a water surface. The skimmer 10 can float right below the surface of the water. The skimmer can operate as a free standing vessel and does not need to be mounted to another vessel for operation. The skimmer of the present invention includes a right side wall/pontoon 20, a left side wall/pontoon 30, a rear wall 40, a floor 50 and a front opening 60. The floor of the skimmer is unobstructed. Floor 50 near opening 60 can be the same height as the part of floor 50 near the rear wall 40. The skimmer 10 has a bottom 70 as seen in FIG. 4-6. The bottom 70 can be flat. Side walls/pontoons 20, 30 are angled at the ends 21, 31 closest to the front opening 60. The floor 50 extends from the front opening 60 to the rear wall 40. Side walls/pontoons can have bumpers 94 on the outside portion of the each wall 20, 30. The body of the skimmer 10 can be one piece, without any moveable parts.

The top of side walls/pontoons 20, 30 can have surface 90, on which a user can stand or sit and monitor the use of the skimmer 10. Railings 93 are attached onto surface 90 and can surround the skimmer floor. Railings 93 assist a user to move about the skimmer vessel during monitoring its use. Bridge 95 can be connected to surface 90 above and across the skimmer floor so that it does not interfere with the flow of oil into the skimmer. Access panels 53 can be located on surface 90 so that a user can access the interior of the skimmer and ballast tanks if necessary.

The skimmer has ballasts tanks 81, 82, 86, 87 that can be contained in body 11 of skimmer. The ballast tanks 81, 82, 86, 87 can sit on either side 20, 30 of the skimmer vessel so that the front opening 60 of the skimmer vessel can be adjusted to sit below the water surface at the level of the oil. Ballast tanks 81, 86 can be included in the front of pontoons 20, 30. Ballast tanks 82, 87 can be included in the rear of pontoon 20, 30. A wall 83 separates the front ballast tank 81, 86 from the rear ballast tank 82, 87. The wall 83 is preferably located in the middle of each pontoon. Optionally, the wall 83 can be located at any location in the pontoon 20, 30.

Inlets 84, 85 can be located on surface 90 of the skimmer apparatus. Front inlets 84 allow water to be added to the front ballast tanks 81, 86. Rear inlets 85 allow water to be added to the rear ballast tanks 82, 87. Vents 92 can be located on surface 90 and at the front and rear of each pontoon 20, 30. Vents 92 allow air to escape from the top of the ballast tank and be replaced by water entering through the ballast tank inlets 84, 85. The ballast tanks adjust the depth of the skimmer floor 50 into the oil and water so that the floor 50 sits at the interface of the oil and water. The platform floor is about one (1) to three (3) inches below the oil on the water surface, or variable to consistency of oil or pollutant floating on water surface. A storage vessel or barge 96 is connected to the skimmer 10 and holds all of the oil collected by the skimmer. During use, a user does not need to continually adjust the ballasts as the skimmer elevation does not change since the storage vessel/barge increases in weight due to the oil it picks up. The tanks are preferably ballasted so that the rear of the skimmer is preferably a little lower in elevation than the front of the skimmer.

The skimmer vessel can work stationary in the water, and does not require a propellor or pulling means for operation, as the oil will continue to flow into the skimmer as the oil is pumped out of the rear by the gravity flow to the rear of the vessel. The storage vessel or barge 96 can also be stationary with the skimmer vessel 10 while the barge pumps the oil from the skimmer vessel to the barge 96. The skimmer 10 can be self-propelled through a body of water with oil or other pollutants by the use of a propulsion device, preferably propellers, attached to the body 11 of the skimmer 10. Optionally, an outboard motor 99 with a propeller 100 or a hydraulic propeller can be attached to the skimmer. The skimmer can also be pushed with a small boat to direct it through the water.

When the skimmer floor 50 is at a desired level in the oil and water, oil flows into the front opening 60 onto the skimmer floor 50. The oil then moves across the floor 50 toward the rear wall 40, where the oil enters a rear location 80. The oil passes over grating 51 which can be located near rear wall 40. Grating 51 assists with preventing large debris from entering the rear location 80. The direction of the oil flow is indicated by arrow 52 in FIG. 3. The rear location 80 is preferably a box or tank. The box or tank 80 is a collection area that can sit at a lower elevation than the skimmer floor 50 intake so that the oil flows from the floor 50 into the rear location 80. Once the oil enters the rear location 80, it moves from the rear location 80 to a storage area/barge 96 via a suction pipe 91, hose 97 and hydraulic pump 98. The suction pipe 91 can be adjustable. The suction pipe 91 attaches from the rear location/tank 80 and discharges the collected oil through a hose 97 to a storage area 96, such as a barge or second vessel that can be situated close to the skimmer vessel, such as for example behind the skimmer (see FIG. 8). The hydraulic pump 98 is connected to the hose 97 on the storage vessel 96. Optionally, the hydraulic pump can be connected to the hose on the skimmer apparatus 10.

The storage vessel or barge 96 can be 12 feet wide×4 feet high×20 feet long with a capacity of 7,000 Gallons to 30 feet wide×8 feet high×120 feet long with a capacity of 168,300 Gallons. Ranges of dimensions for the skimmer 10 can be 12-30 feet wide by 20-120 feet long by 4-8 feet high; for example, skimmer 10 can be 12 feet wide by 4 feet high, by 20 feet long, or any multiple size thereof. The storage vessel or barge has a capacity of 7,000-168,300 gallons, for example 7,000 gallons, or any multiple size thereof of oil or other pollutant.

Experimental results have shown about 95% oil pick up.

The skimmer 10 can be made of aluminum or steel. Exemplary dimensions of the skimmer 10 can be 12-36 feet wide by 20-60 feet long by 3-7 feet high, for example 12 feet wide by 20 feet long by 3 feet high or any multiple size thereof. Skimmer 10 can be sized up or down as desired or appropriate for a particular job.

While preferably the skimmer is self propelled, it can also be stationary and oil can feed into the box 80 via gravity alone when the front opening 60 is positioned at the oil water interface.

PARTS LIST

The following is a list of suitable parts and materials for the various elements of the preferred embodiment of the present invention.

Parts Number Description
10 skimmer
11 skimmer body
20 right side wall
21 end
30 left side wall
31 end
40 rear wall
50 floor
51 grating
52 arrow
53 access panel
60 front opening
70 bottom
80 rear location
81 front ballast tank
82 rear ballast tank
83 wall
84 front ballast inlet
85 rear ballast inlet
86 front ballast tank
87 rear ballast tank
90 surface
91 suction pipe
92 vent
93 railing
94 bumper
95 bridge
96 barge
97 hose
98 pump
99 outboard motor
100 propeller All measurements disclosed herein are at standard temperature and pressure, at sea level on Earth, unless indicated otherwise.

The foregoing embodiments are presented by way of example only; the scope of the present invention is to be limited only by the following claims.

The invention claimed is:

1. An apparatus for removing oil or other pollutants from a water surface, comprising:
   a) a floating platform having an overall length, a bow end, a stern end, spaced apart pontoons including a left pontoon with a left inner side wall, a right pontoon with a right inner side wall, a rear wall, an intake front opening, a platform floor, and a bottom, said left inner and said right inner side walls being generally parallel and each said inner side wall extending over said overall length;
   b) each pontoon having an interior with one or more ballast tanks which adjust the platform floor relative to a level of oil on the water surface;
   c) said pontoons each having a front end portion at the bow end and a rear end portion at the stern end, wherein said rear wall connects to the rear end portions of said pontoons and to said floor to form a closed end portion at said stern end that traps oil in between the pontoons and in front of the rear wall;
   d) wherein the platform floor has a forward edge at said bow end, a rear edge, the elevation of the said forward and rear edges being adjustable with said ballast tanks to define an oil intake elevation so that the oil flows from the front opening at said forward edge and across the floor to the rear edge;
   e) a rear holding tank at said stern end that is below the floor, in front of the rear wall and in between the said inner side walls that collects oil that flows from the intake and platform floor;
   f) a grating that is above the holding tank and that receives flow from the intake front opening and floor, the grating extending over a majority of the area surrounded by the pontoon inner side walls, the rear wall, and the floor rear edge;
   g) a pumping unit that includes a flow line connected to the rear holding tank that moves the oil from the rear holding tank to a storage area that does not affect the one or more ballast tanks of the platform; and
   h) wherein each pontoon, the platform floor and the ballast tanks each extend over a majority of said overall length.

2. The apparatus of claim 1, wherein the storage area includes a second vessel in which the oil is contained.

3. The apparatus of claim 1, wherein the apparatus is self propelled.

4. An apparatus for removing oil or other pollutants from the surface of water, comprising:
   a) floating platform having a platform overall length, a bow end, a stern end, and a pair of spaced apart pontoons, one pontoon being a left pontoon having a left side inner wall, the other pontoon being a right pontoon having aright side inner wall, a rear wall at the stern end that connects to each of the side inner walls, a front oil intake opening having a width, a rectangular floor that connects to each of the side walls, said floor having a leading edge at the bow end, a rear edge, and the platform including a bottom spaced below the floor;
   b) each pontoon having one or more ballast tanks which enable adjustment of the platform floor and the leading edge relative to a level of oil on the water surface;

c) a rear collection tank near the rear wall to collect the oil that flows from the intake opening to the rear wall and across the leading edge and platform floor, wherein the pontoons are spaced apart a distance that is about equal to the width of the oil intake opening;

d) wherein the floor extends from the intake opening and leading edge to the rear edge and over a majority of the platform overall length;

e) the rear collection tank being covered with a grating that extends over a majority of the area surrounded by the rear edge of the floor, the rear wall and the pontoon inner side walls; and f) pump connected to the rear collection tank that moves the oil from the said collection tank to a storage area which does not affect the one or more ballast tanks of the platform, wherein when the front opening and leading edge is below the surface of the oil, wherein oil flows from the front oil intake opening and leading edge across the floor to the rear wall.

5. The apparatus of claim 4, wherein the platform floor is approximately at the interface of the oil and the water.

6. The apparatus of claim 4, wherein the platform floor floats immediately adjacent the lower surface of the oil.

7. The apparatus of claim 4, wherein the one or more ballast tanks are located in the pontoons.

8. The apparatus of claim 4, wherein the pump is a hydraulic pump.

9. The apparatus of claim 4, wherein the floor is unobstructed in between the leading edge and rear edge.

10. The apparatus of claim 4, wherein the bottom is flat.

11. The apparatus of claim 4, wherein the level of the platform floor is controlled by ballasting the ballast tanks.

12. The apparatus of claim 4, further comprising one or more propellers attached to the platform.

13. The apparatus of claim 4, wherein the storage area comprises a second vessel in which the oil is contained.

14. The apparatus of claim 4, wherein the apparatus is self propelled.

15. The apparatus of claim 4, further comprising a vertical wall of at least one of said pontoons that separates one said ballast tank from another said ballast tank.

16. A method of removing oil or other floating pollutants from the surface of water, comprising:

a) providing a floating hull having an overall length, a front, a rear, and a pair of generally parallel spaced apart pontoons, each pontoon with an inner wall and an outer wall, a front oil intake opening, a generally rectangular hull floor, a rear wall that spans from one pontoon inner wall to the other pontoon inner wall at the rear of the hull, and a hull bottom spaced below the floor that extends from the outer wall of one of the pontoons to the outer wall of the other pontoon, and wherein the overall length of the hull is defined by the length of each pontoon;

b) each pontoon providing one or more ballast tanks which enable adjustment of the hull floor elevation relative to an elevation of oil on the water surface;

c) providing a grating and a tank at a rear location to collect oil that flows aft from the hull floor, the tank extending below the grating and aft of the floor and in between the pontoon inner walls; and d) providing a pumping system connected to the tank at the rear location that moves the oil from the tank to a storage area which does not affect the one or more ballast tanks of the hull, wherein when the front opening is maintained by the one or more ballast tanks below the surface of the oil, the oil flows from the front oil intake opening across the floor to the grating, wherein the grating is positioned in front of the rear wall.

17. The method of claim 16, wherein in part "b" of claim 16 the hull floor is approximately at the interface of the oil and the water.

18. The method of claim 16, wherein in part "b" of claim 16 the hull floor floats immediately adjacent the lower surface of the oil.

19. The method of claim 16, wherein in the one or more are located in the pontoons.

20. The method of claim 16, wherein the pump is a hydraulic pump.

21. The method of claim 16, wherein the floor is substantially unobstructed.

22. The method of claim 16, wherein the bottom is flat.

23. The method of claim 16, wherein the level of the hull floor is controlled by ballasting the ballast tanks.

24. The method of claim 16, further comprising one or more propellers attached to the hull.

25. The method of claim 16, further comprising providing a second vessel in which the storage area is located.

26. The method of claim 16, wherein the hull is self propelled.

27. The method of claim 16, wherein a vertical wall separates one of the ballast tanks from another of the ballast tanks.

28. An apparatus for removing oil or other floating pollutants from the surface of water, comprising:

a) a floating hull having a bow, a stern, a hull midpoint in between the bow and the stern, a hull overall length, the hull including a port buoyant pontoon with an inner side wall and a starboard buoyant pontoon with an inner side wall, a stern wall that spans between the said inner side walls, a bow oil intake opening in between the said inner side walls, a floor that spans between and that connects to the said inner walls and the floor extends over a majority of the hull overall length, and wherein the floor has a front edge at the bow and a rear edge;

b) a hull bottom;

c) wherein the pontoons are spaced apart over the entire hull length;

d) a stern collection tank in between the pontoons, placed at an elevation below the floor and in front of the stern wall;

e) the pontoons having one or more ballast tanks which adjust the hull floor relative to a level of oil on the water surface;

f) an oil intake grating above the stern collection tank, the grating extending over a majority of the area surrounded by the stern wall, floor rear edge and pontoon inner side walls;

g) wherein the oil flows from the bow oil intake opening across and above the floor to said grating;

h) wherein the stern wall, inner side walls, floor and stern collection tank define a closed end portion at the stern that collects the oil that flows over the hull floor, said tank extending down to an elevation lower than the floor and the tank and a screen each positioned aft of the midpoint of the hull; and i) a pump that transmits the oil from the stern collection tank to a storage area, wherein said transmission does not affect the one or more ballast tanks of the hull.

29. The apparatus of claim 28 wherein the tank screen spans a majority of the distance between the pontoons.

30. The apparatus of claim 28 wherein the hull has an open top above the floor and a walkway that enables personnel to view the floor over a majority of the area of the floor.

31. The apparatus of claim 30 further comprising a transverse walkway that spans between the pontoons at a position that is in between the intake opening and the stern wall.

\* \* \* \* \*